(12) United States Patent
Minardi (10) Patent No.: US 8,546,704 B1
(45) Date of Patent: Oct. 1, 2013

(54) PRECISE COUNT HIGH VOLUME PREFORM DELIVERY SYSTEM

(76) Inventor: Maurice Minardi, Woodstock, CT (US)

( * ) Notice: Subject to any disclaimer, the term of this patent is extended or adjusted under 35 U.S.C. 154(b) by 208 days.

(21) Appl. No.: 13/161,732

(22) Filed: Jun. 16, 2011

Related U.S. Application Data (60) Provisional application No. 61/355,229, filed on Jun. 16, 2010.

(51) Int. Cl.
*G01G 19/387* (2006.01)
*B65G 11/00* (2006.01)

(52) U.S. Cl.
USPC .......... 177/25.18; 198/540; 198/959; 193/2 R (58) Field of Classification Search
USPC ................ 198/535, 540, 544, 560, 575, 607, 198/959; 193/2 R, 4; 141/83; 222/77; 53/502, 53/539; 177/25.18, 56, 145, 162
See application file for complete search history.

(56) References Cited

U.S. PATENT DOCUMENTS

| | | | | |
|---|---|---|---|---|
| 4,559,981 A * | 12/1985 | Hirano | ............................ | 141/83 |
| 4,602,709 A * | 7/1986 | Ueda | .............................. | 193/2 R |
| 4,693,355 A * | 9/1987 | Bochi et al. | .................... | 193/2 R |
| 4,846,291 A * | 7/1989 | Osawa et al. | ............... | 177/25.18 |
| 4,995,467 A * | 2/1991 | Niemann | .................... | 177/25.18 |
| 5,042,685 A * | 8/1991 | Moulding et al. | ................. | 221/1 |
| 5,736,683 A * | 4/1998 | Howard | ...................... | 177/25.18 |
| 5,765,655 A * | 6/1998 | Tatsuoka | .................... | 177/25.18 |
| 5,817,988 A * | 10/1998 | Suzuki | ............................ | 177/50 |
| 5,854,446 A * | 12/1998 | Tatsuoka et al. | .................. | 177/17 |
| 6,269,971 B1 * | 8/2001 | Nystrom et al. | ................. | 221/13 |
| 6,305,551 B1 * | 10/2001 | Ruymen | ........................ | 209/644 |
| 6,605,785 B1 * | 8/2003 | Muramiya | .................. | 177/25.18 |
| 6,825,424 B2 * | 11/2004 | Yonetsu et al. | ............. | 177/25.18 |
| 7,004,353 B2 * | 2/2006 | Yamamoto et al. | ........... | 221/277 |
| 7,310,923 B2 * | 12/2007 | Taylor | ............................. | 53/502 |
| 7,334,378 B2 * | 2/2008 | Noumi | ............................. | 53/53 |
| 7,531,758 B2 | 5/2009 | Grove | | |
| 7,591,374 B2 * | 9/2009 | Hunter et al. | .................. | 209/3.3 |
| 2002/0084174 A1 | 7/2002 | Minardi | | |

* cited by examiner

*Primary Examiner* — Douglas Hess
(74) *Attorney, Agent, or Firm* — Brian M. Dingman; Dingman IP Law, PC (57) ABSTRACT

A precise-count high-volume preform delivery system. The system employs a soft-drop conveyor system that is used to deliver preforms into a container or another location. An automatically-controlled preform counting system counts preforms before they are delivered to the conveyor, to allow the number of preforms delivered by the conveyor to be determined.

8 Claims, 7 Drawing Sheets

Figure 5 (page 1 of 2)

Figure 5 (page 2 of 2)

8,546,704 B1

PRECISE COUNT HIGH VOLUME PREFORM DELIVERY SYSTEM

CROSS-REFERENCE TO RELATED APPLICATION

This application claims priority of Provisional Patent Application Ser. No. 61/355,229, filed on Jun. 16, 2010. The contents of this prior application are incorporated herein by reference.

FIELD

This disclosure relates to a system that counts plastic bottle preforms.

BACKGROUND

Preforms for blow-molded plastic bottles (such as used for soft drinks and water) are sometimes stored in containers before they are turned into bottles. It is useful for inventory control purposes to know the number of preforms in a container. As preform molds may have many cavities, and a cycle time of only about five to ten seconds, it is difficult to transport preforms away from the mold, count them, and move them into a container, particularly since they are still warm and susceptible to nicks and scratches, particularly in the threaded are of the neck, which can implicate the ability of the bottle to be properly sealed.

SUMMARY

This disclosure encompasses a precise count high volume preform delivery system that provides an accurate piece count while automatically delivering preforms of plastic bottles into storage containers, or to other locations. In one embodiment the system includes an automated weighing chute and control of the speed of the preform conveyor, to accomplish delivery of a precise number of preforms.

The present disclosure features a precise-count high-volume preform delivery system, comprising a soft-drop conveyor system for delivering preforms into a container or another location, and an automatically-controlled preform counting system that counts preforms before they are delivered to the soft-drop conveyor, to allow the number of preforms delivered by the conveyor to be determined. The counting system can comprise a selectively opened and closed chute coupled to a scale that determines the weight of the preforms in the chute.

The counting system may comprise a device for weighing preforms. The preform delivery system may further comprise an assembly that delivers preforms from the counting system to the soft-drop conveyor system. The assembly may comprise a conveyor. The counting system may comprise an accumulator. The accumulator may be constructed and adapted to be emptied. The conveyor may be located underneath the accumulator. The accumulator may comprise a chute with a door that is constructed and adapted to be selectively opened and closed. The counting system may further comprise a weighing device to which the accumulator is operatively coupled such that the weighing device weighs the contents of the accumulator.

Also featured herein is a precise-count high-volume preform delivery system comprising a soft-drop conveyor system for delivering preforms into a storage container or another location, an automatically-controlled preform counting system that counts preforms before they are delivered to the conveyor, to allow the number of preforms delivered by the conveyor to be determined. The counting system may comprise a selectively opened and closed chute coupled to a scale that determines the weight of the preforms in the chute. There is a conveyor located underneath the chute to deliver preforms from the counting system to the soft-drop conveyor system.

Further featured herein is a system for precisely and semi-continuously counting preforms that have been delivered from a preform mold, comprising a chute with a door that is constructed and adapted to be selectively opened and closed, a scale to which the chute is operatively coupled such that the scale weighs the contents of the chute, an operator that is adapted to selectively open and close the chute door, and a controller, responsive to the preform weight as determined by the scale, for causing the operator to open the door, to empty the contents of the chute. This system can also include a first conveyor, located at least in part above the chute, that delivers preforms into the chute, and a second conveyor, located at least in part below the chute, that moves preforms that have been emptied from the chute to another location. Further included can be a third conveyor that moves preforms from the second conveyor to a preform storage location.

BRIEF DESCRIPTION OF THE DRAWINGS

Other objects, features and advantages will occur to those skilled in the art from the following description and the accompanying drawings, in which.

DESCRIPTION OF PREFERRED EMBODIMENT

Figure 1:
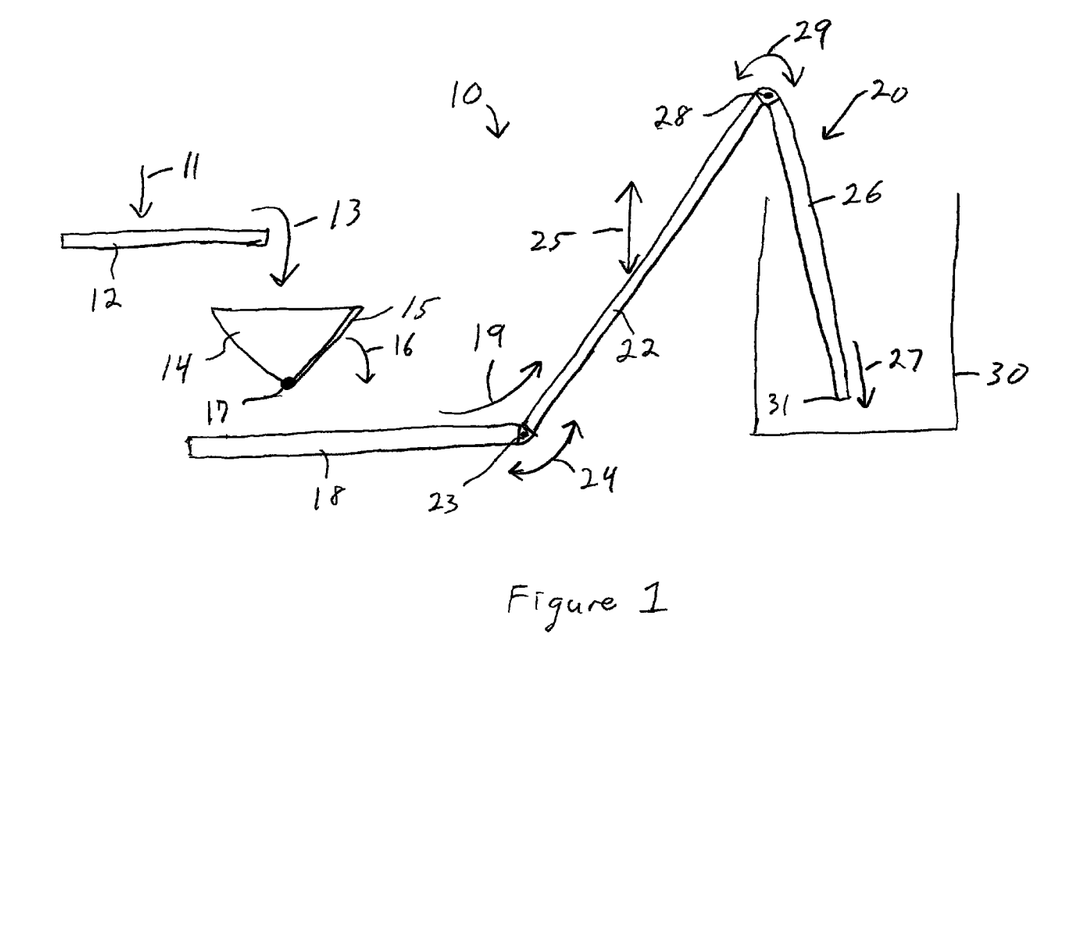
FIG. 1 is a highly schematic view of a precise count high volume preform delivery system.
Figure 2A:
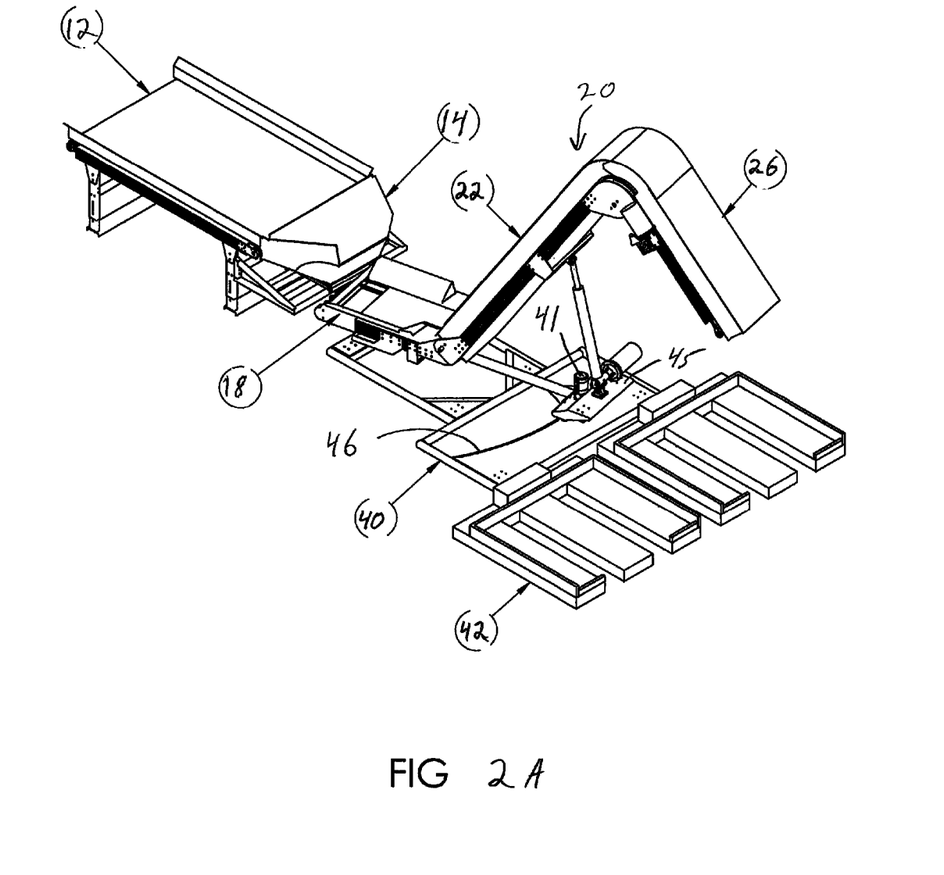
FIG. 2A is a perspective view of a precise count high volume preform delivery system.
Figure 2B:
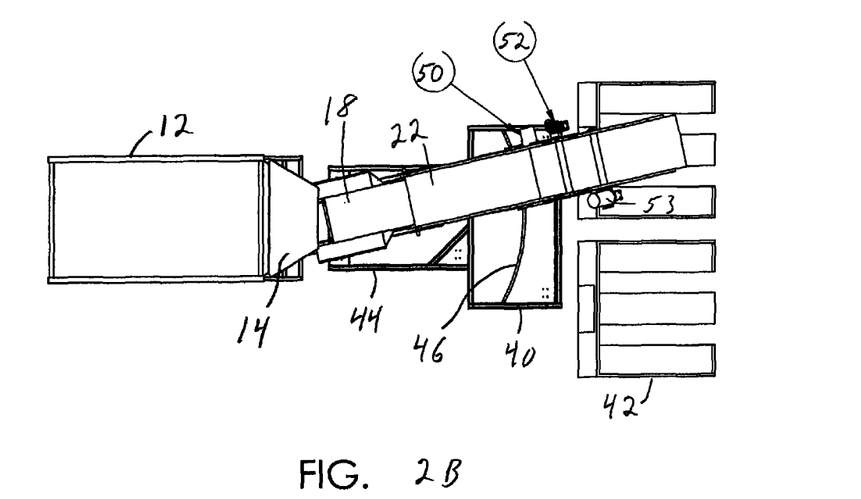
FIGS. 2B and 2C are top and side views, respectively, of the system of FIG. 2A.
Figure 2C:
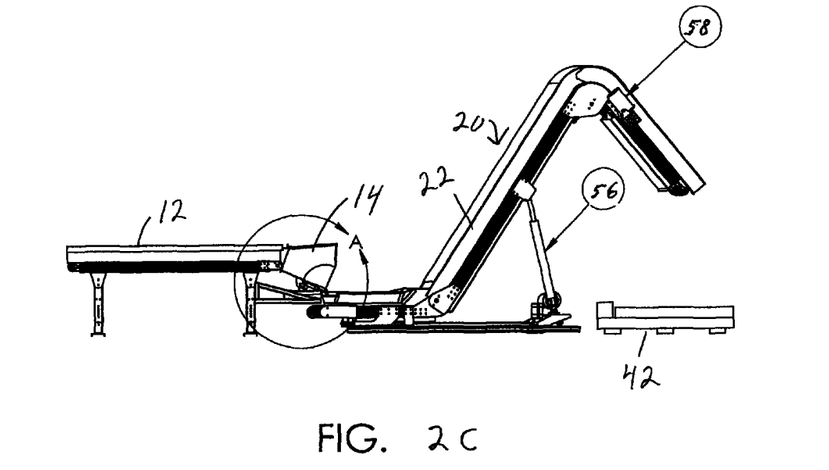

FIG. 1 is a schematic depiction of an embodiment of a precise count high volume preform delivery system 10. Preforms are delivered from a preform molding machine (not shown) in the direction indicated by arrow 11 onto a bi-directional conveyor 12. Preforms are typically molded from PET, and scratching and nicking should be avoided, particularly of the area on the neck that carries the bottle threads. Preforms should be handled carefully.

Conveyor 12 delivers preforms as indicated by arrow 13 into an opening (e.g., an open top) of automated weighing chute 14. Chute 14 has door 15 that is able to pivot open in the direction of arrow 16 about pivot axis 17. This delivers the preforms that are held in chute 14 onto feed conveyor 18 which feeds the preforms in direction 19 to enclosed soft-drop conveyor 20. Conveyor 20 comprises riser leg 22 and delivery leg 26 that deliver preforms as indicated by arrow 27 into storage container 30 (or to a different location, for example direct to a blow-molding machine). Riser 22 is adapted to be pivoted in the direction of arrow 24 about pivot axis 23. Section 26 is adapted to be pivoted in the direction of arrow 29 about pivot axis 28. Pivoting of section 22 is accomplished by moving section 22 up and down in the direction of arrow 25. This moves delivery end 31 up and down relative to the delivery location. The operation of soft-drop conveyor system 20, and its use to deliver preforms gently into box or container 30, while evenly filling the box, is further described in United States Patent Application Publication No. 2002/008417 A1 published on Jul. 4, 2002, the disclosure of which is incorporated herein by reference.

The preferred embodiment of the precise count high volume preform delivery system is disclosed in more detail in FIGS. 2 through 5. Conveyor 12 and conveyor 20 are described in the patent application incorporated by reference. The drawings also show base 40 that defines track 46. Motor 41 moves conveyor base portion 45 about track 46 to pivot conveyor 20 left and right so that preforms can be delivered to one container while another full container is moved away and replaced with an empty container. This allows uninterrupted delivery of recently-molded preforms. Delivery area 42 in this case provides receptors for two boxes and shaken platforms on which the boxes sit. The platforms can be controlled to periodically and briefly gently vibrate the containers to allow more even filling without unacceptable scratching or nicking of the preforms. Linear actuator 56 moves riser 22 up and down in the direction of arrow 25. Motors 50, 52, 53 and 58 provide other control of the angle and speed of the soft-drop conveyor system 20.

Figure 3A:
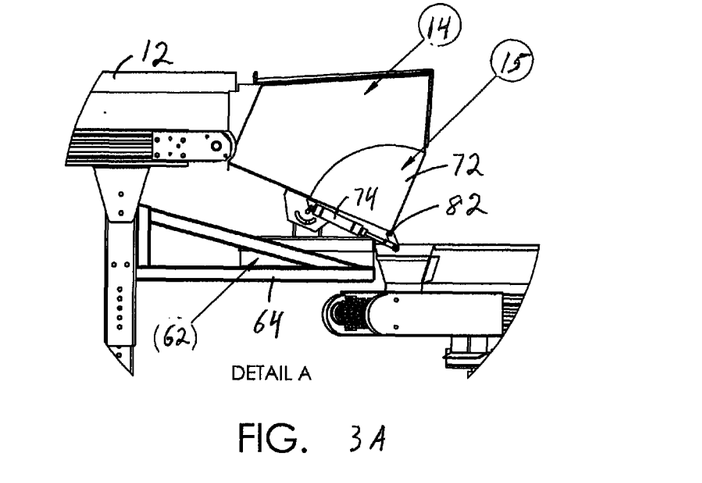
FIG. 3A is a side view and FIG. 3B an exploded view of portion A of FIG. 2C.
Figure 3B:
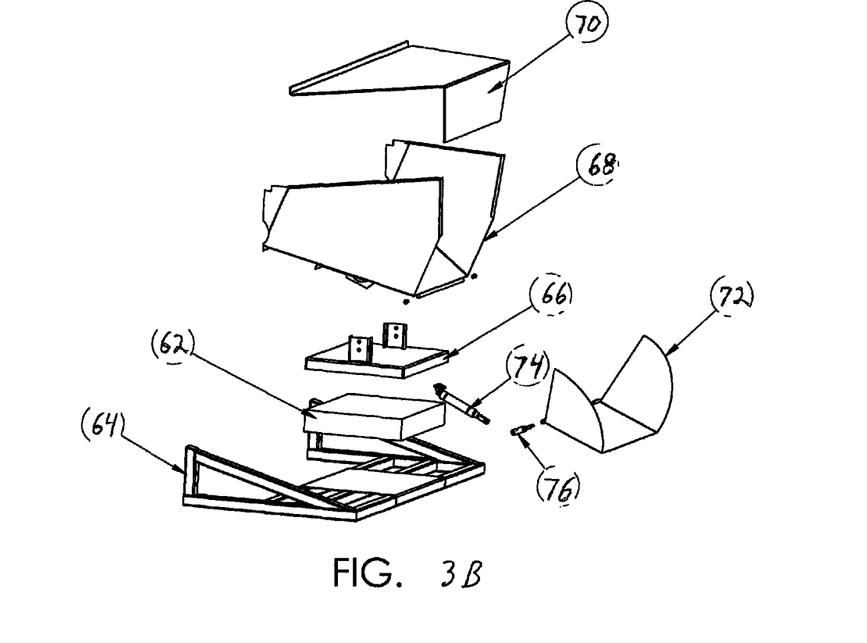

Automated weighing chute 14 is shown in more detail in FIGS. 3A and 3B. Base 68 and cover 70 accomplish a chute with a sloped bottom and that is open at the left and right ends. The opening at the left end is placed at the exit point of feed conveyor 12. The far side opening (at the right end in FIG. 3B) is selectively closeable with pivoting door 72 that pivots about axis 82 under control of actuator 74 and link 76. Platform 66 couples chute 14 to weighing scale 62 that is supported on platform 64 that is mounted to the undercarriage of conveyor 12. This construction allows the chute 14 to be interposed between the end of conveyor 12 and the receiving area of conveyor 18.

Figure 4:
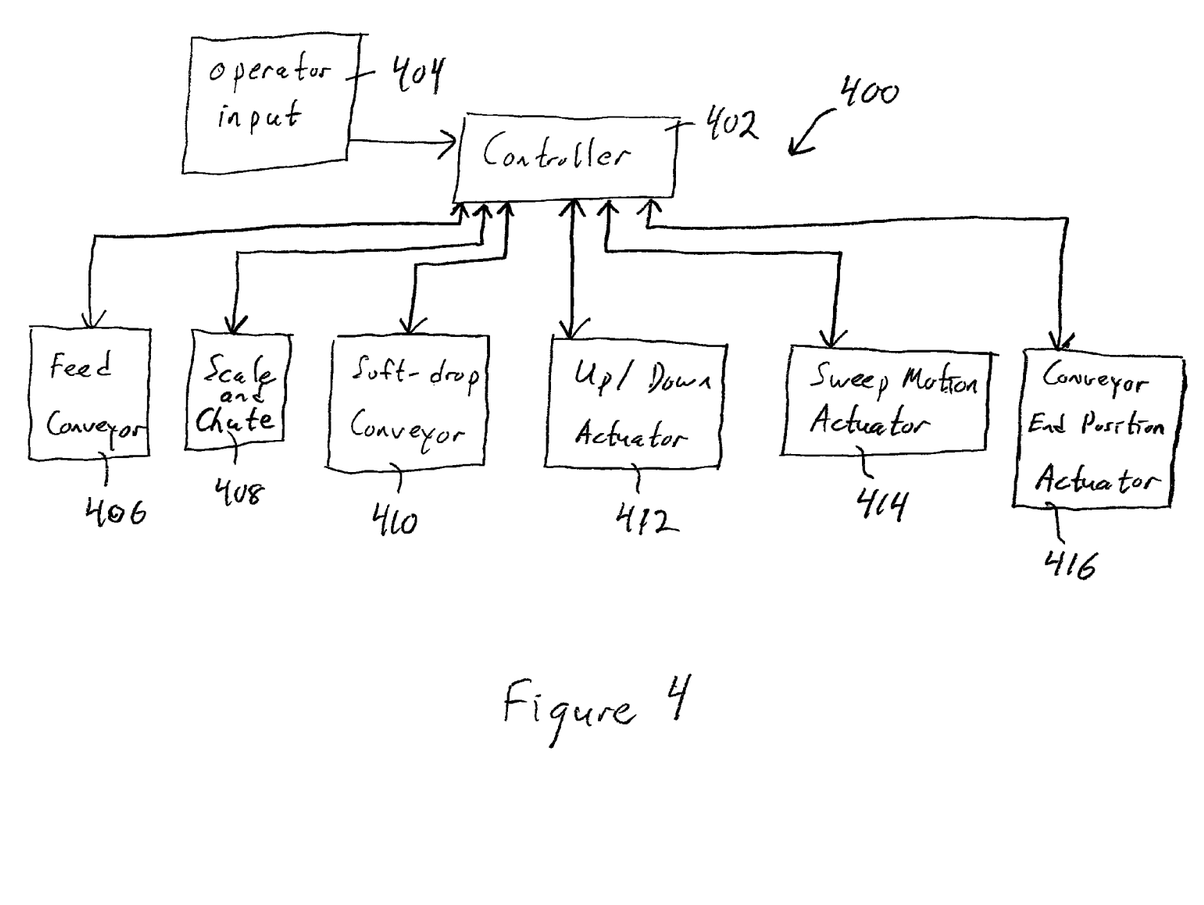
FIG. 4 is a block diagram of a control system.

FIG. 4 is a schematic block diagram of the control system for delivery system 10. Control system 400 comprises main controller 402 that accepts operator input 404 as necessary. Controller 402 communicates with and controls the feed conveyor through variable frequency drive 406, the scale and chute door through variable frequency drive 408, the soft-drop conveyor speed through variable frequency drive 410, the soft-drop conveyor up/down actuator through variable frequency drive 412, the soft-drop conveyor sweep motion actuator through variable frequency drive 414, and the position of the end 31 of section 26 of the soft-drop conveyor through variable frequency drive 416.

Figure 5:
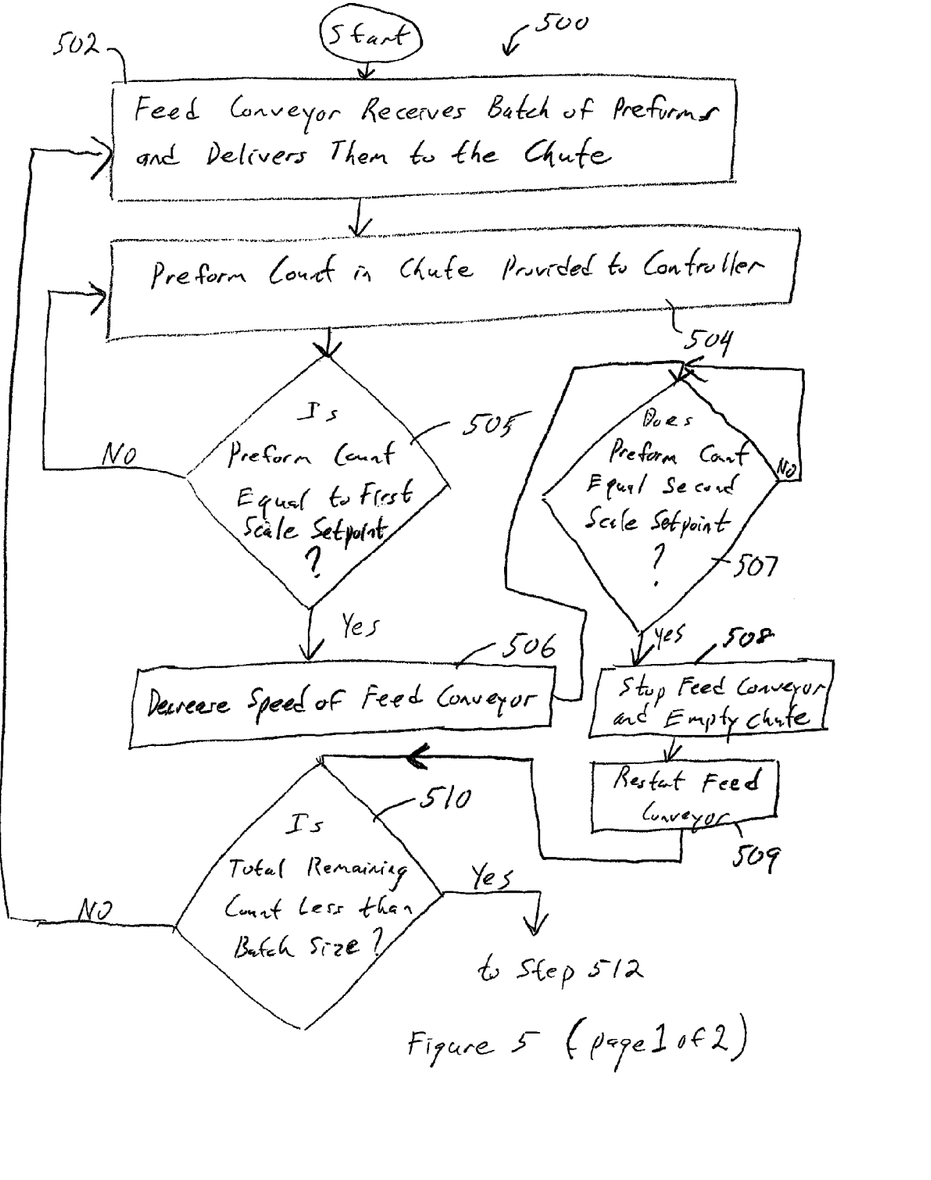
FIG. 5 is a flow chart detailing an operation of the system.

An operation of the preform delivery system that controls the system to deliver a predetermined quantity of preforms is detailed in FIG. 5. Flow chart 500 begins with step 502 in which feed conveyor 12 receives one or more batches of preforms and delivers them to the chute. The chute is enabled to count the number of preforms held in the chute, step 504. This can be accomplished as follows. The weight of the preforms is known. As the weight of plastic can vary with humidity, for greater accuracy an average preform weight can be experimentally determined each day, and used as the preform weight. By keeping track of the amount of weight held in the chute, the number of preforms in the chute can be determined and provided to the controller, step 504. The system can track two set-points for the scale, one being close to the desired quantity of preforms to be held by the chute (e.g., 95% of a filled chute), and one being the desired quantity of preforms to be held by the chute (i.e., 100%). When the quantity equals the first set-point, step 505, the speed of the feed conveyor is slowed so that there is less possibility of the chute being overfilled, step 506. When the chute has been properly filled (i.e., the desired quantity set point has been reached), step 507, the feed conveyor is stopped and the chute emptied, step 508. Chute weight is then zeroed, and the feed conveyor is then restarted, step 509.

One goal of the system is to deliver a predetermined quantity of preforms. This quantity is typically many times the batch size. For example, a batch size may be 144 preforms and one container may hold several thousands of preforms. Typically, a batch of preforms is delivered to the feed conveyor about every 5-15 seconds.

The control system can establish as a set point the total number of preforms to be delivered. The system can also track and save the actual preform count when the container is determined to be filled, and the actual preform count of the previously-filled container. If the total count remaining to fill the container is greater than the batch size, the operation continues through steps 502 to 510. If the total remaining count is less than the batch size, the feed conveyor speed is decreased, step 512. This slows the delivery of preforms into the chute. When the total remaining number of preforms to fill the container has been reached in the chute, step 514, the feed conveyor is stopped, step 516, and the chute is emptied, step 518. Steps 516 and 518 happen quickly so that the number of preforms on the feed conveyor does not build up unacceptably. To account for the fact that it can take more than seven seconds for preforms to traverse the length of the soft-drop conveyor, at step 22 the speed of that conveyor is increased until the conveyor is cleared. This is accomplished by running the conveyor at high speed for a predetermined amount of time that is sufficient to move all preforms through the conveyor into the container. The result is that the exact predetermined quantity of preforms is now in the container. The feed conveyor is then restored to normal speed, step 520. The soft-drop conveyor is typically then moved to another empty container and the conveyor is then returned to normal speed, step 524.

In an alternative embodiment the scale is not used. In this embodiment the preform count is based on the number of preforms in a batch, which itself is based on the mold capacity. One potential issue with this approach is that preform molds typically have many cavities (e.g., 144 cavities) and it is not uncommon for one or more of the cavities to be out of service. In such cases an accurate preform count would likely need to take into account only the number of active cavities. An advantage of this approach is that a scale and in-line weighing is not needed.

Other alternative embodiments utilize other known means to automatically count preforms. One example could be a machine vision system that was able to count the preforms after they left the mold and before they were deposited into the container or delivered to a different location; the machine vision system could for example be in the location of the chute in FIGS. 1 and 2A. Other means of automatically counting preforms (whether now known or developed in the future) are also within the scope of this disclosure.

What is claimed is:

1. A system for automatically delivering to a storage container plastic items that are molded in a molding machine that molds up to a batch of such items at a time, where the weight of an item is known and where the quantity of items to be delivered to the storage container is predetermined, the system comprising:
   i) an item accumulating and weighing unit that is constructed and arranged to:
      a) receive and accumulate a plurality of molded items, up to a predetermined set point quantity of molded items;
      b) weigh the received and accumulated molded items;

c) based on the known item weight, convert the weight to a quantity of accumulated items; and
d) deliver the accumulated items out of the accumulating and weighing unit;
ii) a first conveyor system that receives items from the molding machine and delivers them to the accumulating and weighing unit;
iii) a second conveyor system that receives the accumulated items from the accumulating and weighing unit and delivers them into the storage container; and
iv) a controller that is adapted to:
   a) track the quantity of items that have been delivered out of the accumulating and weighing unit;
   b) compare the tracked quantity to the predetermined quantity of items to be delivered to the storage container;
   c) determine the remaining quantity of items needed to meet the predetermined quantity of items to be delivered to the storage container;
   d) when the remaining quantity is equal to or greater than the set point quantity, operate the first conveyor such that up to the set point quantity of items is delivered to the accumulating and weighing unit; and
   e) when the remaining quantity is less than the set point quantity, operate the first conveyor such that only the remaining quantity of items is delivered to the accumulating and weighing unit.

2. The system of claim 1 wherein the accumulating and weighing unit comprises a selectively opened and closed chute coupled to a scale that determines the weight of the items in the chute.

3. The system of claim 2 wherein the second conveyor system comprises a first conveyor that is located underneath the chute.

4. The system of claim 3 wherein the chute has a door that is constructed and adapted to be selectively opened and closed.

5. The system of claim 4
   wherein the first conveyor system comprises a second conveyor, located at least in part above the chute, that delivers items into the chute; and
   wherein the first conveyor of the second conveyor system is located at least in part below the chute, and moves items that have been emptied from the chute to another location.

6. The system of claim 5 wherein the second conveyor system further comprises a third conveyor that moves items from the first conveyor into the storage container.

7. The system of claim 6 wherein the container is an open-top box with sidewalls and a bottom, and wherein the third conveyor comprises a soft-drop conveyor that conveys items up over a sidewall of the box and then down into the bottom of the box.

8. The system of claim 7 wherein the plastic items are preforms.

* * * * *